(12) United States Patent
Walters et al.

(10) Patent No.: US 12,415,887 B2
(45) Date of Patent: Sep. 16, 2025

(54) METHODS OF PREPARING COATED SUBSTRATES AND NON-AQUEOUS, CURABLE FILM-FORMING COMPOSITIONS USED THEREFOR

(71) Applicant: PPG Industries Ohio, Inc., Cleveland, OH (US)

(72) Inventors: David N. Walters, Slippery Rock, PA (US); David Joseph Fortman, Pittsburgh, PA (US); Scott William Sisco, Glenshaw, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 170 days.

(21) Appl. No.: 18/003,555

(22) PCT Filed: Jul. 1, 2021

(86) PCT No.: PCT/US2021/040131
§ 371 (c)(1),
(2) Date: Dec. 28, 2022

(87) PCT Pub. No.: WO2022/006423
PCT Pub. Date: Jan. 6, 2022

(65) Prior Publication Data
US 2023/0287173 A1    Sep. 14, 2023

Related U.S. Application Data

(60) Provisional application No. 63/046,863, filed on Jul. 1, 2020.

(51) Int. Cl.
*C08G 63/00* (2006.01)
*C08G 63/668* (2006.01)
*C08G 63/82* (2006.01)
*C08K 5/5415* (2006.01)
*C09D 167/00* (2006.01)

(52) U.S. Cl.
CPC .......... *C08G 63/668* (2013.01); *C08G 63/82* (2013.01); *C08K 5/5415* (2013.01); *C09D 167/00* (2013.01); *C08G 2150/00* (2013.01)

(58) Field of Classification Search
CPC .. C08G 63/668; C08G 63/82; C08G 2150/00; C08K 5/5415; C09D 167/00
USPC .................................................. 106/287.1
See application file for complete search history.

(56) References Cited

U.S. PATENT DOCUMENTS

| | | |
|---|---|---|
| 3,560,589 A | 2/1971 | Sato et al. |
| 4,429,082 A | 1/1984 | Lee et al. |
| 4,430,486 A | 2/1984 | Chang et al. |
| 4,468,492 A | 8/1984 | Piccirilli et al. |
| 4,798,745 A | 1/1989 | Martz et al. |
| 5,182,355 A | 1/1993 | Martz et al. |
| 5,225,519 A | 7/1993 | Tortolina |
| 5,239,012 A | 8/1993 | McEntire et al. |
| 5,258,481 A | 11/1993 | Hesselmans et al. |
| 5,518,770 A | 5/1996 | Goliaszewski et al. |
| 5,578,675 A | 11/1996 | Mormile et al. |
| 8,623,983 B2 | 1/2014 | Lange et al. |
| 2008/0119580 A1 | 5/2008 | Menovcik et al. |
| 2010/0247785 A1* | 9/2010 | Martz .................. C09D 183/04 524/588 |
| 2013/0144006 A1 | 6/2013 | Derksen et al. |
| 2015/0197674 A1* | 7/2015 | Spyrou ................ C09D 175/00 524/607 |
| 2019/0085202 A1 | 3/2019 | Rectenwald et al. |

FOREIGN PATENT DOCUMENTS

| | | | |
|---|---|---|---|
| JP | 347871 | 2/1991 | |
| JP | 2843408 B2 | 1/1999 | |
| JP | 2006282741 A | 10/2006 | |
| WO | WO-2009/045558 A2 | 4/2009 | |
| WO | WO-2018025669 A1 * | 2/2018 | ............. B32B 15/09 |
| WO | 2018128032 A1 | 7/2018 | |

OTHER PUBLICATIONS

International Search Report and Written Opinion received for PCT Application Serial No. PCT/US2021/040131 dated Oct. 21, 2021, 11 pages.

* cited by examiner

*Primary Examiner* — James E McDonough

(57) ABSTRACT

The present invention is directed to non-aqueous, curable film-forming compositions comprising: a) an anhydride functional compound; b) at least one of: (i) a hydroxyl functional compound having at least two hydroxyl functional groups and (ii) a carbodiimide functional compound; and c) hydrolyzable functional groups. After application of the curable film-forming composition to a substrate to form a coated substrate, and upon subjecting the coated substrate to curing conditions, the curable film-forming composition undergoes multiple cure reactions. The present invention is further directed to methods of preparing coated substrates with these compositions.

17 Claims, No Drawings

METHODS OF PREPARING COATED SUBSTRATES AND NON-AQUEOUS, CURABLE FILM-FORMING COMPOSITIONS USED THEREFOR

CROSS REFERENCE TO RELATED APPLICATIONS

This application is a national stage filing of international patent application PCT/US21/40131, filed Jul. 1, 2021, titled "METHODS OF PREPARING COATED SUBSTRATES AND NON-AQUEOUS, CURABLE FILM-FORMING COMPOSITIONS USED THEREFOR", which in turn claims priority to U.S. Provisional Application No. 63/046,863, filed Jul. 1, 2020, titled "METHODS OF PREPARING COATED SUBSTRATES AND NON-AQUEOUS, CURABLE FILM-FORMING COMPOSITIONS USED THEREFOR", each of which is incorporated herein by reference in their entireties.

FIELD OF THE INVENTION

The present invention relates to non-aqueous, curable film-forming compositions capable of undergoing multiple cure reactions, and methods of preparing coated substrates with them.

BACKGROUND OF THE INVENTION

Two-package ("2K") polyurethane coatings have become the industry standard in many aerospace, industrial, and automotive refinish applications for their combination of ambient temperature curing, durability, and weatherability. These coatings typically rely on polyfunctional isocyanate crosslinkers which can present concerns with user sensitization. As a result, isocyanates are becoming increasingly regulated because they are believed to pose environmental health and safety risks.

The coatings industry has taken an interest in developing non-isocyanate coatings that are comparable in performance to polyurethane systems. However, developing novel, safer compositions with properties competitive with isocyanate-cured coatings is an ongoing challenge. Non-isocyanate crosslinkers for existing hydroxyl functional resins which offer similar performance attributes would be of particular value to multiple businesses.

It would be desirable to provide curable film-forming compositions that undergo isocyanate-free cure chemistries, and that proceed at ambient conditions to yield coatings with properties comparable to polyurethane coatings.

SUMMARY OF THE INVENTION

The present invention is directed to non-aqueous, curable film-forming compositions comprising: a) an anhydride functional compound; b) at least one of: (i) a hydroxyl functional compound having at least two hydroxyl functional groups and (ii) a carbodiimide functional compound; and c) hydrolyzable functional groups. The anhydride functional compound may comprise either (i) an addition polymer that is not prepared from an alkoxyvinyl silane or (ii) a small molecule as defined below. The hydrolyzable functional groups may be present on the anhydride functional compound, the hydroxyl functional compound, the carbodiimide functional compound, and/or on a separate compound that is different from the anhydride functional compound, the hydroxyl functional compound, and the carbodiimide functional compound.

After application of the curable film-forming composition to a substrate to form a coated substrate, and upon subjecting the coated substrate to curing conditions, the curable film-forming composition undergoes multiple cure reactions via: i) reaction of the anhydride or an acid functional group derived therefrom with hydroxyl and/or carbodiimide functional groups; and ii) condensation of hydrolyzed groups formed from the hydrolyzable functional groups. The present invention is further directed to methods of preparing coated substrates with these compositions.

DETAILED DESCRIPTION OF THE INVENTION

Other than in any operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used in this specification and the appended claims, the articles "a," "an," and "the" include plural referents unless expressly and unequivocally limited to one referent.

The various embodiments and examples of the present invention as presented herein are each understood to be non-limiting with respect to the scope of the invention.

As used in the following description and claims, the following terms have the meanings indicated below:

The term "curable", as used for example in connection with a curable composition, means that the indicated composition is polymerizable or cross linkable through functional groups, e.g., by means that include, but are not limited to, thermal (including ambient cure) and/or catalytic exposure. Ambient temperature usually ranges from 60 to 90° F. (15.6 to 32.2° C.), such as a typical room temperature, 72° F. (22.2° C.).

The term "cure", "cured" or similar terms, as used in connection with a cured or curable composition, e.g., a "cured composition" of some specific description, means that at least a portion of the polymerizable and/or crosslinkable components that form the curable composition is polymerized and/or crosslinked through reactive functional groups, to the extent that a cured film prepared from the composition demonstrates no damage from at least 50 methylethyl ketone (MEK) double rubs according to ASTM D5402-19. The test method may be performed, for example, using the specified cheesecloth or another suitable cloth such as a Wypall X80 towel available from Kimberly Clark Corporation. Additionally, curing of a polymerizable composition refers to subjecting said composition to curing conditions such as but not limited to thermal curing, leading to the reaction of the reactive functional groups of the composition, and resulting in polymerization and formation of a polymerizate. When a polymerizable composition is subjected to curing conditions, following polymerization and after reaction of most of the reactive groups occurs, the rate of reaction of the remaining unreacted reactive groups becomes progressively slower. The polymerizable composition can be subjected to curing conditions until it is at least partially cured. The term "at least partially cured" means subjecting the polymerizable composition to curing conditions, wherein reaction of at least a portion (e. g., at least 5 percent) of the reactive groups of the composition occurs, to form a polymerizate. The polymerizable composition can also be subjected to curing conditions such that a complete cure is attained (for example, greater than 50 percent of reactive groups have reacted) and wherein further curing results in no further improvement in polymer properties, such as hardness.

The term "reactive" refers to a functional group capable of undergoing a chemical reaction with itself and/or other functional groups spontaneously or upon the application of heat or in the presence of a catalyst or by any other means known to those skilled in the art. Note that the phrase "and/or" when used in a list is meant to encompass alternative embodiments including each individual component in the list as well as any combination of components. For example, the list "A, B, and/or C" is meant to encompass seven separate embodiments that include A, or B, or C, or A+B, or A+C, or B+C, or A+B+C.

The curable film-forming composition of the present invention is non-aqueous. By "non-aqueous" is meant that the composition may be a liquid that is solventborne and/or up to 100% solids, or the composition may be a solid particulate (i. e., "powder") composition. In a solventborne composition, solid components are dispersed and/or dissolved in an organic solvent medium. As used herein, an "organic solvent medium" refers to a liquid medium comprising at least 50 weight % organic solvent, based on the total weight of the liquid medium. Such liquid mediums can for example comprise at least 60 weight % organic solvent, or at least 70 weight % organic solvent, or at least 80 weight % organic solvent, or at least 90 weight % organic solvent, or at least 95% organic solvent, based on the total weight of the liquid medium. The composition may comprise up to 100% solids. As such, components may, for example, be dissolved and/or dispersed in an organic medium that comprises in whole or in part an organic reactive diluent. The composition may also be essentially free of water. By "essentially free" of a material is meant that a composition has only trace or incidental amounts of a given material, and that the material is not present in an amount sufficient to affect any properties of the composition; typically less than 0.2 percent by weight, such as less than 0.1 percent by weight, or less than 0.05 percent by weight, based on the total weight of the composition.

As noted, the composition may contain organic solvents as necessary for the purposes of formulation. Such solvents include ketones, such as methyl amyl ketone and methyl isobutyl ketone; aromatic hydrocarbons, such as xylene; glycol ethers, such as propylene glycol methyl ether, propylene glycol monopropyl ether, ethylene glycol monobutyl ether, dipropylene glycol monomethyl ether, and ethylene glycol monohexyl ether; and/or esters such as 2-butoxyethyl ester of acetic acid and propylene glycol monomethyl ether acetate. Other solvents including alcohols, such as butanol, may be suitable and may additionally serve as scavengers or reactive diluents, depending on the reactivity of the hydroxyl group (i. e., primary vs. secondary vs. tertiary). Mixtures of any of the foregoing solvents may also be used.

The curable film-forming composition of the present invention comprises: a) an anhydride functional compound, typically having at least one anhydride functional group. The anhydride functional compound may comprise a "small molecule" (i.e., a compound having a molecular weight less than 1000, such as less than 700, or less than 500, and at least 98, or at least 125, or at least 200, as determined by mass spectroscopy). Monomeric compounds such as anhydrides with molecular weights in the range of 98 to 400 are typical. Examples include one or more of maleic anhydride, hexahydrophthalic anhydride, succinic anhydride, phthalic anhydride, tetrahydrophthalic anhydride, including alkyl-substituted anhydrides such as methyl hexahydrophthalic anhydride and methyl succinic anhydride. Often the anhydride functional group is cyclic.

The anhydride functional compound a) in the curable film-forming compositions of the present invention may comprise an anhydride-containing polymer. Such polymers are typically not prepared from alkoxyvinyl silanes. In other words, the polymers are not prepared using any vinyl monomers that contain silane functional groups (as opposed to (meth)acrylic monomers that contain silane functional or other hydrolyzable groups as discussed below, which may be used). By "polymer" is meant a polymer including homopolymers and copolymers, and oligomers. For example, the anhydride functional compound a) may comprise an addition polymer, prepared from ethylenically unsaturated monomers or polymeric compounds such as anhydride functional polymers having number average molecular weights up to 1,000,000 such as in the range of at least 1,000, or at least 50,000, or at least 100,000, to at most 1,000,000, or at most 500,000, or at most 250,000, as measured using gel permeation chromatography with a polystyrene standard.

Ethylenically unsaturated anhydrides useful in the preparation of an anhydride-containing addition polymer include, for instance, itaconic anhydride, maleic anhydride, isobutenyl succinic anhydride and the like. Typically, the ethylenically unsaturated anhydride may be present in the reaction mixture used to prepare the addition polymer in amounts of at least 1 percent by weight and up to 50 percent by weight, such as 5 to 40 percent by weight, based on total weight of monomers used to prepare the polymer.

The ethylenically unsaturated anhydride may be polymerized with one or more other ethylenically unsaturated monomers not having an anhydride moiety including vinyl ethers, vinyl esters, 1-octene, 1-butene, isobutylene, styrene, 2-methyl styrene, and the like. The preparation of an exemplary anhydride-containing polymer is demonstrated in the Examples below. One skilled in the art would appreciate that one or more of the afore-mentioned or other ethylenically unsaturated monomers would be suitable for reaction with one or more ethylenically unsaturated anhydrides in a similar fashion to prepare an anhydride-containing polymer for use as the anhydride-containing compound a).

Other examples of suitable anhydride-containing polymers are, for instance, anhydride-containing (meth)acrylic polymers such as (meth)acrylic polymers having at least two anhydride groups. Typically the anhydride-containing polymers such as anhydride-containing (meth)acrylic polymers have a number average molecular weight of 1,000 to 1,000,000 as measured using gel permeation chromatography with a polystyrene standard. The term "(meth)acrylate" is meant to encompass acrylate and/or methacrylate molecular structures where they exist.

An exemplary anhydride-containing (meth)acrylic polymer can be prepared by various means known to one skilled in the art such as conventional free-radical or controlled free-radical polymerization. For example, an anhydride-containing (meth)acrylic polymer can be prepared by conventional techniques in which the monomers, solvent, and conventional initiators such as t-butyl perbenzoate are charged into a polymerization vessel and heated to between 75° and 200° C. for about 0.5 to 6 hours to form the polymer.

An anhydride-containing (meth)acrylic polymer can be formed by copolymerizing monomers selected from alkyl methacrylates, alkyl acrylates or mixtures thereof, where the alkyl groups can have 1-12 carbon atoms, with ethylenically unsaturated anhydrides (or ethylenically unsaturated dicarboxylic acids which are converted to the acid anhydride during the polymerization).

Typical alkyl acrylates and methacrylates that can be used to form an anhydride-containing (meth)acrylic polymer may include methyl methacrylate, ethyl methacrylate, propyl methacrylate, butyl methacrylate, pentyl methacrylate, hexyl methacrylate, octyl methacrylate, decyl methacrylate, lauryl methacrylate, methyl acrylate, ethyl acrylate, propyl acrylate, butyl acrylate, octyl acrylate, nonyl acrylate, decyl acrylate, lauryl acrylate, isobornyl acrylate, isobornyl methacrylate, and the like. Other ethylenically unsaturated monomers, i.e. ethylenically unsaturated monomers different from alkyl (meth)acrylates and ethylenically unsaturated anhydrides (or ethylenically unsaturated dicarboxylic acids which are converted to the acid anhydride during the polymerization), such as styrene, 2-methyl styrene, (meth)acrylonitrile, (meth)acrylamide, (meth)acrylo alkoxy silanes and (meth)acrylic acid may also be used. Mixtures of two or more of the above monomers are often used. The non-anhydride monomers are typically present in amounts of up to 99 percent by weight, such as 50 to 95 percent by weight, based on the total weight of the monomers used to prepare the polymer.

The anhydride functional compound a) is present in the curable film-forming composition of the present invention in an amount of at least 5, such as at least 10, or at least 20 percent by weight, based on the total weight of resin solids in the curable film-forming composition. The anhydride functional compound a) is present in the curable film-forming composition of the present invention in an amount of at most 60, such as at most 50, or at most 40 percent by weight, based on the total weight of resin solids in the curable film-forming composition. For example, the anhydride functional compound a) may be present in the curable film-forming composition of the present invention in an amount of 5 to 60 percent by weight, or 5 to 50 percent by weight, or 5 to 40 percent by weight, or 10 to 60 percent by weight, or 10 to 50 percent by weight, or 10 to 40 percent by weight, or 20 to 60 percent by weight, or 20 to 50 percent by weight, or 20 to 40 percent by weight.

The curable film-forming composition of the present invention further comprises b) at least one of: (i) a hydroxyl functional compound having at least two hydroxyl functional groups and (ii) a carbodiimide functional compound. As such, the curable film-forming composition of the present invention may comprises (i) a hydroxyl functional compound having at least two hydroxyl functional groups, or (ii) a carbodiimide functional compound, or both (i) a hydroxyl functional compound having at least two hydroxyl functional groups and (ii) a carbodiimide functional compound.

Suitable hydroxyl functional compounds (i) include polyhydric alcohols such as ethylene glycol, propylene glycol, butylene glycol, 1,6-hexylene glycol, neopentyl glycol, diethylene glycol, glycerol, trimethylol propane, and pentaerythritol. More often the hydroxyl functional compounds (i) are polymers, such as acrylic polyols, polyester polyols, and/or polyurethane polyols.

Suitable acrylic polyols include copolymers of one or more alkyl esters of acrylic acid or methacrylic acid, optionally together with one or more other polymerizable ethylenically unsaturated monomers. Useful alkyl esters of acrylic acid or methacrylic acid include aliphatic alkyl esters containing from 1 to 30, and often 4 to 18 carbon atoms in the alkyl group. Non-limiting examples include methyl methacrylate, ethyl methacrylate, butyl methacrylate, ethyl acrylate, butyl acrylate, and 2-ethyl hexyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate.

The acrylic copolymer includes hydroxyl functional groups, which are often incorporated into the polymer by including one or more hydroxyl functional monomers in the reactants used to produce the copolymer. Useful hydroxyl functional monomers include hydroxyalkyl acrylates and methacrylates, typically having 2 to 4 carbon atoms in the hydroxyalkyl group, such as hydroxyethyl acrylate, hydroxypropyl acrylate, 4-hydroxybutyl acrylate, hydroxy functional adducts of caprolactone and hydroxyalkyl acrylates, and corresponding methacrylates, as well as the hydroxy ester functional monomers described below.

Hydroxy ester functional monomers can be prepared from either i) ethylenically unsaturated, epoxy functional monomers and carboxylic acids having from about 13 to about 20 carbon atoms, or from ii) ethylenically unsaturated acid functional monomers and epoxy compounds containing at least 5 carbon atoms which are not polymerizable with the ethylenically unsaturated acid functional monomer.

Useful ethylenically unsaturated, epoxy functional monomers used to prepare the hydroxy ester functional monomers include glycidyl acrylate, glycidyl methacrylate, allyl glycidyl ether, methallyl glycidyl ether, 1:1 (molar) adducts of ethylenically unsaturated monoisocyanates with hydroxy functional monoepoxides such as glycidol, and glycidyl esters of polymerizable polycarboxylic acids such as maleic acid. Examples of carboxylic acids include saturated monocarboxylic acids such as isostearic acid and aromatic unsaturated carboxylic acids.

Useful ethylenically unsaturated acid functional monomers used to prepare the hydroxy ester functional monomers include monocarboxylic acids such as acrylic acid, methacrylic acid, crotonic acid; dicarboxylic acids such as itaconic acid, maleic acid and fumaric acid; and monoesters of dicarboxylic acids such as monobutyl maleate and monobutyl itaconate. The ethylenically unsaturated acid functional monomer and epoxy compound are typically reacted in a 1:1 equivalent ratio. When an ethylenically unsaturated acid functional monomer is used to prepare the hydroxy ester functional monomers, the epoxy compound does not contain ethylenic unsaturation that would participate in free radical-initiated polymerization with the unsaturated acid functional monomer. Useful epoxy compounds include 1,2-pentene oxide, styrene oxide and glycidyl esters or ethers, often containing from 8 to 30 carbon atoms, such as butyl glycidyl ether, octyl glycidyl ether, phenyl glycidyl ether and para-(tertiary butyl) phenyl glycidyl ether. Particular glycidyl esters include those of the structure:

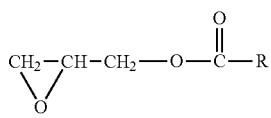

where R is a hydrocarbon radical containing from about 4 to about 26 carbon atoms. Typically, R is a branched hydrocarbon group such as neopentanoate, neoheptanoate or neodecanoate. Suitable glycidyl esters of carboxylic acids include VERSATIC ACID 911 and CARDURA E, each of which are commercially available from Shell Chemical Co.

The preparation of an exemplary polymeric acrylic polyol using hydroxybutyl acrylate is demonstrated in the Examples below. One skilled in the art would appreciate that one or more of the afore-mentioned or other ethylenically unsaturated monomers would be suitable for reaction with one or more ethylenically unsaturated hydroxyl functional monomers in a similar fashion to prepare a polymeric acrylic polyol for use as the hydroxyl functional compound (i).

The resulting acrylic polymer may have a hydroxyl value of at least 25, or at least 50, in some cases at least 100, in other cases at least 150. Additionally, the acrylic polymer may have a hydroxyl value of not more than 250, in some cases not more than 225, in other cases not more than 200, based on the total weight of the acrylic polymer. The hydroxyl value may be determined, for example, using Method A or B of ASTM E222-10 (2010). The hydroxyl value of the acrylic polymer may be any value or any range of values inclusive of those stated above. For example, the resulting acrylic polymer may have a hydroxyl value of 25 to 250, or 50 to 225, or 50 to 200, or 100 to 250, or 100 to 225, or 100 to 200, or 150 to 250, or 150 to 225, or 150 to 200, based on the total mass of the acrylic polymer, including any solvents that are present.

The hydroxyl functional compound (i) may additionally or alternatively comprise a polyester polyol. Such polymers may be prepared in a known manner by condensation of polyhydric alcohols and polycarboxylic acids, while using the polyhydric alcohols in stoichiometric excess. Suitable polyhydric alcohols include, but are not limited to, ethylene glycol, propylene glycol, butylene glycol, 1,6-hexylene glycol, neopentyl glycol, diethylene glycol, glycerol, trimethylol propane, and pentaerythritol. Suitable polycarboxylic acids include, but are not limited to, succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used.

Polyurethanes may additionally or alternatively be used as the hydroxyl functional compound (i) in the curable film-forming composition. Among the polyurethanes which can be used are polymeric polyols which generally are prepared by reacting a polyol such as those mentioned above, or a different polyol such as a polyether polyol with a polyisocyanate such that the OH/NCO equivalent ratio is greater than 1:1 and free hydroxyl groups are present in the product.

The organic polyisocyanate which is used to prepare the polyurethane polyol can be an aliphatic or an aromatic polyisocyanate or a mixture of the two. Diisocyanates include toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate and/or 4,4'-diphenylmethane diisocyanate. Biurets of any suitable diisocyanate including 1,4-tetramethylene diisocyanate and 1,6-hexamethylene diisocyanate may be used. Also, biurets of cycloaliphatic diisocyanates such as isophorone diisocyanate and 4,4'-methylene-bis-(cyclohexyl isocyanate) can be employed. Examples of suitable aralkyl diisocyanates from which biurets may be prepared are meta-xylylene diisocyanate and α,α,α',α'-tetramethylmeta-xylylene diisocyanate.

Trifunctional isocyanates may also be used to prepare the polyurethane polyol, for example, trimers of isophorone diisocyanate, triisocyanato nonane, triphenylmethane triisocyanate, 1,3,5-benzene triisocyanate, 2,4,6-toluene triisocyanate, an adduct of trimethylol and tetramethyl xylene diisocyanate sold under the name CYTHANE 3160 by CYTEC Industries, and DESMODUR N 3390, which is the isocyanurate of hexamethylene diisocyanate, available from Covestro AG. Other polyisocyanates include trimers of diisocyanates such as hexamethylene diisocyanate and isophorone diisocyanate. DESMODUR Z 4470 BA, an aliphatic polyisocyanate based on isophorone diisocyanate available from Covestro AG, is also suitable.

The component b) in the curable film-forming composition of the present invention may additionally or alternatively comprise (ii) a carbodiimide functional compound. The compound may have at least two carbodiimide functional groups, or when the carbodiimide functional compound further includes hydrolyzable functional groups, compounds that are monofunctional with respect to carbodiimide groups are suitable.

Suitable polycarbodiimides may be prepared by reacting a polyisocyanate such as any of those disclosed above in the presence of an appropriate catalyst to form carbodiimides with the release of carbon dioxide, followed by reacting residual isocyanate with an active hydrogen functional material. Any suitable organic compound containing active hydrogens may be used. The term "active hydrogen" refers to hydrogens which, because of their position in a molecule, display activity according to the Zerewitinoff test. Accordingly, active hydrogens include hydrogen atoms attached to oxygen, sulfur or nitrogen, and thus useful compounds will include those having at least one of these groups (in any combination) such as primary amine, secondary amine, alcohol, and/or thiol. Suitable examples of secondary amines include dialkylamines, such as diisopropylamine, dibutylamine, and the like. The preparation of an exemplary carbodiimide functional compound using 4,4'-methylene dicyclohexyl diisocyanate and dibutylamine is demonstrated in the Examples below. Additionally, the active hydrogen-containing material used in the preparation of the polycarbodiimide may contain at least two active-hydrogen-containing groups and may act as a chain extender or spacer linking polyisocyanates together to form NCO-adducts or to link NCO-functional polycarbodiimides together. One skilled in the art would appreciate that one or more of the afore-mentioned or other polyisocyanates would be suitable for reaction with one or active hydrogen-containing compounds in a similar fashion to prepare a polycarbodiimide for use as the carbodiimide functional compound (ii). The active hydrogen-containing material may be added before, during or after carbodiimide formation.

Other suitable polycarbodiimides include Carbodilite V-05 and Zoldine XL-29SE, commercially available from Nisshinbo Chemical, Inc., and Angus Chemical Company, respectively.

The hydroxyl functional compound (i) of the component b) may be present in the curable film-forming composition of the present invention in an amount of at least 10, such as at least 20, or least 35, or at least 40, or at least 45 percent by weight, based on the total weight of resin solids in the curable film-forming composition. The hydroxyl functional compound (i) of the component b) may be present in the curable film-forming composition of the present invention in an amount of at most 90, such as at most 80, or at most 70 percent by weight, based on the total weight of resin solids in the curable film-forming composition. The carbodiimide functional compound (ii) of the component b) may be present in the curable film-forming composition of the present invention in an amount of at least 5, such as at least 15, or at least 25 percent by weight, based on the total weight of resin solids in the curable film-forming composition. The carbodiimide functional compound (ii) of the component b) may be present in the curable film-forming composition of the present invention in an amount of at most 80, such as at most 65, or at most 50 percent by weight, based on the total weight of resin solids in the curable film-forming composition.

The curable film-forming composition of the present invention further comprises c) hydrolyzable functional groups different from anhydride. By "hydrolyzable" is meant functional groups that may undergo hydrolysis in the presence of water molecules and subsequently condense, such as by self-condensation, to form crosslinks. The hydrolyzable functional groups typically comprise one or more of alkoxysilane (such as methoxysilane, ethoxysilane, and the like); acetoxysilane, ketoxime silane, silicates, including orthosilicates such as alkylorthosilicates; titanates such as tetraalkyl titanates; and zirconates such as tetraalkyl zirconates. Chelates of titanium, zirconium, and/or silicon are also suitable. The hydrolyzable functional groups may be present on the anhydride functional compound, the hydroxyl functional compound, the carbodiimide functional compound, and/or on a separate compound that is different from the anhydride functional compound, the hydroxyl functional compound, and the carbodiimide functional compound. For example, the hydrolyzable groups may be present only on the anhydride functional compound, only on the hydroxyl functional compound, only on the carbodiimide functional compound, only on the separate compound, or on two or more of the compounds.

Examples of anhydride functional compounds a) that further comprise hydrolyzable functional groups include 3-(trialkoxysilyl)propyl succinic anhydrides, such as 3-(triethoxysilyl)propyl succinic anhydride and 3-(trimethoxysilyl)propyl succinic anhydride. When the anhydride functional compound a) comprises a polymer, hydrolyzable functional groups may be incorporated, for example, by including (meth)acrylic monomers that contain hydrolyzable functional groups in the reaction mixture used to prepare the polymer. Examples of suitable silane functional monomers include methacryloxyethoxytris(trimethoxy) silane, 3-methacryloxypropyl tris-(2-methoxyethoxy) silane, and 3-(Trimethoxysilyl)propyl methacrylate, available as SILQUEST A-174 from Momentive Performance Chemicals.

Hydroxyl functional compounds (i) that further comprise hydrolyzable functional groups may be prepared, for example, by preparing an acrylic polyol as above with ethylenically unsaturated monomers comprising hydrolyzable groups such as any of those disclosed above. Alternatively, a polyol may be reacted with an isocyanato silane. Carbodiimide functional compounds (ii) that further comprise hydrolyzable functional groups may be prepared, for example, by preparing a carbodiimide such as any of those disclosed above and reacting the residual isocyanate with a primary amine, secondary amine, thiol, and/or alcohol that further comprises a hydrolyzable functional group. The preparation of an exemplary carbodiimide functional compound having hydrolyzable functional groups using 4,4'-methylene dicyclohexyl diisocyanate and N-(n-butyl)-3-aminopropyltrimethoxysilane is demonstrated in the Examples below. One skilled in the art would appreciate that one or more of the afore-mentioned or other polyisocyanates would be suitable for reaction with one or more similar active hydrogen functional materials having hydrolyzable functional groups in a similar fashion to prepare a polycarbodiimide for use as a carbodiimide functional compound having hydrolyzable functional groups. In a particular example of the present invention, the curable film-forming composition comprises an anhydride functional compound, a hydroxyl functional compound, and a carbodiimide functional compound, wherein the hydrolyzable functional groups comprise alkoxysilane functional groups that are present on at least the carbodiimide functional compound.

As noted above, the hydrolyzable functional groups may be present additionally or alternatively on a separate compound that is different from the anhydride functional compound, the hydroxyl functional compound, and the carbodiimide functional compound. The preparation of an exemplary compound having hydrolyzable functional groups using hexamethylene diisocyanate trimer, 1,6-hexanediol, and N-(n-butyl)-3-aminopropyltrimethoxysilane is demonstrated in the Examples below. One skilled in the art would appreciate that one or more of the afore-mentioned or other polyisocyanates would be suitable for reaction with one or more polyols and active hydrogen functional materials having hydrolyzable functional groups in a similar fashion to prepare a compound having hydrolyzable functional groups.

In certain examples of the present invention, the curable film-forming composition is essentially free of polyepoxide functional compounds; i. e., compounds having more than one epoxy functional group. In addition, the curable film-forming composition is often essentially free of reactive compounds prepared from polyolefins such as polyethylene, polypropylene, polyisobutylene, polymethylpentene (PMP), polybutene-1 (PB-1); and ethylene propylene rubber.

The curable film-forming compositions of the present invention may further comprise a filler. Examples of fillers that can be present include finely divided minerals such as barium sulfate, silica, including fumed silica and colloidal silica, alumina, colloidal alumina, titanium dioxide, zirconia, colloidal zirconia, clay, mica, dolomite, talc, magnesium carbonate, calcium carbonate, calcium sulfate, and the like. It is believed that the fillers, in combination with the resins in the composition, allow for useful rheological properties such as thixotropy. Fillers such as colloidal silica may also serve to enhance mar and scratch resistance.

The film-forming composition can additionally include a variety of optional ingredients and/or additives that are somewhat dependent on the particular application of the curable composition, such as pigments or other colorants, reinforcements, thixotropes, accelerators, surfactants, plasticizers, extenders, stabilizers, corrosion inhibitors, diluents, hindered amine light stabilizers, UV light absorbers, adhesion promoters, and antioxidants. The curable film-forming composition may be a color coat or clear coat.

As noted above, the curable film-forming compositions of the present invention can also include a colorant. As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the curable film-forming compositions of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

As noted above, the colorant can be in the form of a dispersion including, but not limited to, a nanoparticle dispersion. Nanoparticle dispersions can include one or more nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle.

Example special effect compositions that may be used in the curable film-forming compositions of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as reflectivity, opacity or texture. In a non-limiting example, special effect compositions can produce a color shift, such that the color of the coating changes when the coating is viewed at different angles. Example color effect compositions are identified in U.S. Pat. No. 6,894,086. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain non-limiting examples, a photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting example, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In a non-limiting example, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting example of the present invention, have minimal migration out of the coating. Example photosensitive compositions and/or photochromic compositions and methods for making them are identified in U.S. Application Publication No. 2006/0014099.

In general, the colorant can be present in the curable film-forming composition in any amount sufficient to impart the desired property, visual and/or color effect. The colorant may comprise from 1 to 65 weight percent of the present compositions, such as from 3 to 40 weight percent or 5 to 35 weight percent, with weight percent based on the total weight of the compositions.

The curable compositions used in the present invention can be prepared as a one-package or multi-package such as a two-package composition, more often as a multi-package composition that may be curable at ambient temperature. Multi-package curable compositions are typically prepared by combining the ingredients immediately before use. The composition may further comprise a catalytic material, present in one or more of the packages or in a separate package. The hydrolyzable functional groups may be present on any of the compounds or on a separate compound, in one or more of the packages or in a separate package.

In a particular example of the present invention, the curable film-forming composition comprises separate packages, wherein a first package comprises the anhydride functional compound a); and wherein a second package comprises the carbodiimide functional compound (ii); and wherein the packages are separate from one another until immediately prior to application of the curable film-forming composition to the substrate.

In another example of the present invention, the curable film-forming composition comprises separate packages, wherein a first package comprises the anhydride functional compound a); and wherein a second package comprises the hydroxyl functional compound (i); and wherein the curable film-forming composition further comprises d) a catalytic material that catalyzes a chemical reaction between hydroxyl and anhydride functional groups; and wherein the packages are separate from one another until immediately prior to application of the curable film-forming composition to the substrate. The catalytic material d) may be present in the first package, more often the second package, and/or a third package.

Suitable catalytic materials that catalyze a chemical reaction between hydroxyl and anhydride functional groups include any of those known in the art; in particular, nitrogenous bases such as pyridine, dimethylaminopyridine, 1,4-diazabicyclo[2.2.2]octane, 1,5,7-triazabicyclo[4.4.0]dec-5-ene, tertiary amines such as dimethylethanolamine, dimethylcocoamine, phosphines, phosphonium and/or ammonium salts of organic acids such as phosphonium acetates, Lewis acids, and the like.

The curable film-forming compositions of the present invention may be used to prepare a coated substrate, comprising: 1) a substrate having at least one coatable surface, and 2) a cured film-forming composition on at least one surface of the substrate, wherein the cured film-forming composition is formed from any of the curable film-forming compositions described above.

The present invention is further drawn to a method for forming a coated substrate. The method comprises:
  (A) optionally applying a primary film-forming composition to at least a portion of a surface of the substrate to form a first coating;
  (B) applying a curable film-forming composition directly to at least a portion of a surface of the substrate or to at least a portion of the first coating formed in step (A) to form a coated substrate, wherein the curable film-forming composition comprises:
    a) an anhydride functional compound;
    b) at least one of: (i) a hydroxyl functional compound having at least two hydroxyl functional groups and (ii) a carbodiimide functional compound; and
    c) hydrolyzable functional groups different from anhydride that are present on the anhydride functional compound, the hydroxyl functional compound, the carbodiimide functional compound, and/or on a separate compound that is different from the anhydride functional compound, the hydroxyl functional compound, and the carbodiimide functional compound; wherein the curable film-forming composition is essentially free of polyepoxide functional compounds; and
  (C) subjecting the coated substrate to curing conditions whereby the curable film-forming composition undergoes multiple cure reactions via i) reaction of the anhydride or an acid functional group derived therefrom with hydroxyl and/or carbodiimide functional groups and ii) condensation of hydrolyzed groups formed from the hydrolyzable functional groups.

In the method of the present invention, suitable anhydride functional compounds a) that further comprise hydrolyzable functional groups may include, in addition to or alternatively to those disclosed above, anhydride functional addition polymers prepared with ethylenically unsaturated monomers comprising an alkoxysilane or other hydrolyzable functional groups. Examples of such monomers include vinyl trialkoxysilanes such as vinyl triethoxysilane and SILQUEST A-171 (available from Momentive Performance Materials, Inc.).

The preparation of exemplary anhydride-containing polymers having hydrolyzable functional groups is demonstrated in the Examples below. One skilled in the art would appreciate that one or more of the afore-mentioned or other ethylenically unsaturated monomers comprising alkoxysilane groups or other hydrolyzable groups would be suitable for reaction with one or more ethylenically unsaturated anhydrides in a similar fashion to prepare an anhydride-containing polymer having hydrolyzable functional groups.

Suitable substrates include rigid metal substrates such as ferrous metals, aluminum, aluminum alloys, copper, and other metal and alloy substrates. The ferrous metal substrates used in the practice of the present invention may include iron, steel, and alloys thereof. Non-limiting examples of useful steel materials include cold rolled steel, galvanized (zinc coated) steel, electrogalvanized steel, stainless steel, pickled steel, zinc-iron alloy such as GALVANNEAL, and combinations thereof. Combinations or composites of ferrous and non-ferrous metals can also be used. In certain embodiments of the present invention, the substrate comprises a composite material such as a plastic or a fiberglass composite. Often the substrates are used in turbines and aircraft parts such as airfoils, wings, stabilizers, rudders, ailerons, engine inlets, propellers, rotors, fuselage and the like. The substrates may also be used in vehicle components such as wheels, bumpers, fenders, hoods, doors, panels, etc., on automobiles, trucks, watercraft, and the like; or on construction equipment, building structures such as corrugated metal walls or roofing, wind blades, bridge supports, or other outdoor structures.

Other suitable substrates include any that are transparent (i. e., demonstrate a light transmittance or % Transmission of at least 70%) to electromagnetic radiation having any frequency between 22 and 81 GHz, in particular, 76 to 81 GHz. For example, the curable film-forming compositions may be applied over optical substrates known in the art, including non-plastic substrates such as glass. Suitable examples of optical plastic substrates include polyol(allyl carbonate), e.g., allyl diglycol carbonates such as diethylene glycol bis(allyl carbonate), which is sold under the trademark CR-39 by PPG; polyurea-polyurethane (polyurea urethane) polymers, which are prepared, for example, by the reaction of a polyurethane prepolymer and a diamine curing agent, a composition for one such polymer being sold under the trademark TRIVEX® by PPG; polyol(meth)acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly(ethylene glycol) bismethacrylate monomers; urethane acrylate monomers; poly(ethoxylated Bisphenol A dimethacrylate); poly(vinyl acetate); poly(vinyl alcohol); poly(vinyl chloride); poly(vinylidene chloride); polyethylene; polypropylene; polyurethanes; polythiourethanes; thermoplastic polycarbonates, such as the carbonate-linked resin derived from Bisphenol A and phosgene, one such material being sold under the trademark LEXAN; polyesters, such as the material sold under the trademark MYLAR; poly(ethylene terephthalate); polyvinyl butyral; poly(methyl methacrylate), such as the material sold under the trademark PLEXIGLAS, and polymers prepared by reacting polyfunctional isocyanates with polythiols or polyepisulfide monomers, either homopolymerized or co- and/or terpolymerized with polythiols, polyisocyanates, polyisothiocyanates and optionally ethylenically unsaturated monomers or halogenated aromatic-containing vinyl monomers. Also suitable are copolymers of such monomers and blends of the described polymers and copolymers with other polymers, e.g., to form interpenetrating network products. Such optical substrates may be used as lenses, screens, or covers (for transmitters, receivers, and the like) on components of autonomous vehicles.

Before depositing any coating compositions upon the surface of the substrate, it is common practice, though not necessary, to remove foreign matter from the surface by thoroughly cleaning and degreasing the surface. Such cleaning typically takes place after forming the substrate (stamping, welding, etc.) into an end-use shape. The surface of the substrate can be cleaned by physical or chemical means, such as mechanically abrading the surface or cleaning/degreasing with commercially available alkaline or acidic cleaning agents which are well known to those skilled in the art, such as sodium metasilicate and sodium hydroxide. A non-limiting example of a cleaning agent is CHEMKLEEN 163, an alkaline-based cleaner commercially available from PPG Industries, Inc.

Following the cleaning step, the substrate may be rinsed with deionized water, with a solvent, or an aqueous solution of rinsing agents in order to remove any residue. The substrate can be air dried, for example, by using an air knife, by flashing off the water by brief exposure of the substrate to a high temperature or by passing the substrate between squeegee rolls.

The substrate may be a bare, cleaned surface; it may be oily, or pretreated with one or more pretreatment compositions. The surface of the substrate may be further prepared by sanding or other conventional preparation processes. Optionally in step (A), at least a portion of a surface of the substrate may be coated with one or more primary film-forming compositions such as electrocoats, primers, surfacers, topcoats including pigmented basecoats, etc., applied by any method including, but not limited to, electrodeposition, spraying, dip coating, roll coating, curtain coating, and the like, to form a first coating.

The composition described above may be applied directly to at least a portion of a surface of the substrate (e. g., "direct-to-metal") or to at least a portion of the first coating if applied as step (A), by one or more of a number of methods including spraying, dipping/immersion, brushing, or flow coating. They are most often applied by spraying. The usual spray techniques and equipment for air spraying and electrostatic spraying and either manual or automatic methods can be used. The coating layer typically has a dry film thickness of 1-25 mils (25.4-635 microns), often 2-15 mils (50-381 microns).

Suitable electrocoat compositions for use as a primary film-forming composition include ED 6465; primers include HP78224EH, both commercially available from PPG Industries, Inc. Alternatively, a primer may not be used and the film-forming compositions can be applied directly to a pigmented basecoat or other coating. Multiple coating layers such as an electrocoat and a primer and optionally a colored base coat may be applied to the substrate prior to application of the curable film-forming composition described above. The curable film-forming compositions described in step (B) above, including curable film-forming compositions of the present invention, are often used as clear coats in an automotive OEM or refinish setting.

After forming a film of the coating on the substrate, the composition can be cured, usually by subjecting it to a temperature of at least 35° C., or at least 100° C., or at least 125° C., to at most 250° C., or at most 200° C., or at most 150° C. Exemplary temperature ranges include 35-250° C., 35-200° C., 35-150° C., 100-250° C., 100-200° C., 100-150° C., 125-250° C., 125-200° C., and 125-150° C. In some instances, the composition may be cured by subjecting it to a temperature below 80° C., or in a range of 0-80° C.; or below 35° C., or in a range of 10-35° C.; such as at ambient temperature (for example, a typical room temperature, 72° F. (22.2° C.)). Such a cure regimen may be suitable for a multi-package composition that includes a catalytic material, which can effect or facilitate a reaction below 35° C. The composition may be cured at ambient temperature typically for at least one hour, or at least 5 hours, or at least 24 hours, such as in a period ranging from about one hour to several weeks, or from about 24 hours to several days, or from about 24 hours to about 36 hours. A combination of ambient temperature cure and baking may be used to cure the composition, or baking alone. If ambient temperature and baking are utilized in combination, the composition is often allowed to stand ("flash") for a period of from about 2 minutes to about 120 minutes at a temperature ranging from ambient to 175° F. (79.4° C.), followed by baking at a temperature up to about 300° F. (148.9° C.), usually 285° F. (140.6° C.) for a period of time ranging from about 20 minutes to about 1 hour.

After application of the curable film-forming composition to a substrate to form a coated substrate, and upon subjecting the coated substrate to curing conditions, the curable film-forming composition undergoes multiple (i. e., more than one different) cure reactions via i) reaction of the anhydride or an acid functional group derived therefrom with hydroxyl and/or carbodiimide functional groups and ii) condensation of hydrolyzed groups formed from the hydrolyzable functional groups. The curable film-forming compositions used in the method of the present invention undergo isocyanate-free cure chemistries, and may proceed at ambient conditions to yield coatings with properties comparable to polyurethane coatings.

The following examples are intended to illustrate various embodiments of the invention, and should not be construed as limiting the invention in any way.

EXAMPLES

Abbreviations
 TRIGONOX 131=tert-amylperoxy 2-ethylhexyl carbonate, available from AkzoNobel Functional Chemicals
 LUPEROX 575=t-amylperoxy octoate, available from Arkema, Inc.
 TRIGONOX 21=t-butyl peroctoate, available from AkzoNobel Functional Chemicals
 BA=butyl acrylate
 MMA=methyl methacrylate
 4-HBA=4-hydroxybutyl acrylate
 BMA=butyl methacrylate
 STY=styrene
 MAA=methacrylic acid
 SILQUEST A-174=3-(Trimethoxysilyl)propyl methacrylate, available from Momentive Performance Chemicals
 Vinyl TEOS=Vinyl triethoxysilane Various resins for use in the preparation of curable film-forming compositions of the present invention were prepared as shown in the Synthesis examples below.

Synthesis Example A: Hydroxybutylacrylate Polyol

In a four neck round bottom flask, 409.5 grams of butyl acetate (BuAc) was added and the flask was set up with a mechanical stir blade, thermocouple, and reflux condenser. The flask containing BuAc solvent was heated to a set point of 130° C. under a nitrogen atmosphere. A monomer solution containing 315.0 grams of MMA, 262.5 grams of 4-HBA, 105.0 grams of BA, 157.5 grams of STY, and 210.0 grams of BMA was thoroughly mixed in a separate container. A solution of 52.5 grams of TRIGONOX 131 and 147.0 grams of BuAc was prepared and added into the flask over 190 minutes through an initiator addition funnel. Ten minutes after the initiator solution feed started, the monomer solution feed was started and added over 180 minutes through a monomer addition funnel. After both initiator and monomer feeds were complete, the monomer addition funnel was rinsed with 42.0 grams of BuAc. The reaction was then held at 130° C. for 60 minutes. Then another solution of 5.5 grams of TRIGONOX 131 and 15.8 grams of BuAc was added over 30 minutes through the initiator addition funnel. After this second initiator feed was complete, the initiator addition funnel was rinsed with 42.0 grams of BuAc. The reaction was then held at 130° C. for 60 minutes. After the 60 minute hold, the reaction was cooled and poured into a suitable container. The final measured solids content of the resin was determined to be 63.17% solids.

Synthesis Example B: Maleic Anhydride-Octene Copolymer

In a four neck round bottom flask, 295.8 grams of 1-octene was added and the flask was set up with a mechanical stir blade, thermocouple, and reflux condenser. The flask containing 1-octene monomer was heated to a set point of 125° C. under a nitrogen atmosphere. A monomer solution containing 197.2 grams of maleic anhydride and 394.4 grams of butyl acetate (BuAc) was thoroughly mixed in a separate container until the maleic anhydride was fully dissolved. To the flask containing 1-octene, 73.9 grams of LUPEROX 575 was added over 165 minutes through an initiator addition funnel. Fifteen minutes after the initiator feed was started, the monomer solution feed was started and added over 150 minutes through a monomer addition funnel. After both initiator and monomer feeds were complete, the monomer addition funnel was rinsed with 10.0 grams of BuAc and the initiator addition funnel was rinsed with 23.0 grams of BuAc. The reaction was then held at 125° C. for 30 minutes. After the 30 minute hold, the reaction was cooled and poured into a suitable container. The final measured solids content of the resin was determined to be 49.39% solids.

Synthesis Example C: Maleic Anhydride-Octene-Vinyl TEOS Copolymer

In a four neck round bottom flask, 246.5 grams of 1-octene and 49.3 grams of vinyl TEOS was added and the flask was set up with a mechanical stir blade, thermocouple, and reflux condenser. The flask containing 1-octene and vinyl triethoxysilane was heated to a set point of 125° C. under a nitrogen atmosphere. A monomer solution containing 197.2 grams of maleic anhydride and 394.4 grams of butyl acetate (BuAc) was thoroughly mixed in a separate container until the maleic anhydride was fully dissolved. To the flask containing 1-octene and vinyl triethoxysilane, 73.9 grams of LUPEROX 575 was added over 165 minutes through an initiator addition funnel. Fifteen minutes after the initiator feed started, the monomer solution was started and added over 150 minutes through a monomer addition funnel. After both initiator and monomer feeds were complete, the monomer addition funnel was rinsed with 10.0 grams of BuAc and the initiator addition funnel was rinsed with 23.0 grams of BuAc. The reaction was then held at 125° C. for 30 minutes. After the 30 minute hold, the reaction was cooled and poured into a suitable container. The final measured solids content of the resin was determined to be 52.18% solids.

Synthesis Example D: Styrene-Maleic Anhydride Copolymer

In a four neck round bottom flask, 106.6 grams of ethyl-3-ethoxypropionate (EEP) and 82.3 grams of butyl acetate (BuAc) was added and the flask was set up with a mechanical stir blade, thermocouple, and reflux condenser. The flask containing EEP and BuAc solvents was heated to a set point of 150° C. under a nitrogen atmosphere. A monomer solution containing 98.4 grams of EEP, 98.4 grams of BuAc, 56.8 grams of MMA, 113.6 grams of maleic anhydride, 227.1 grams of STY, and 170.3 grams of BA was thoroughly mixed in a suitable container until the maleic anhydride was fully dissolved. A solution of 79.5 grams of TRIGONOX 21 and 39.6 grams of EEP was prepared and added into the flask over 190 minutes through an initiator addition funnel. Ten minutes after the initiator solution started, the monomer solution was started and added over 180 minutes through a monomer addition funnel. After both initiator and monomer feeds were complete, the monomer addition funnel was rinsed with 6.6 grams of EEP and 8.1 grams of BuAc. Then another solution of 5.5 grams of TRIGONOX 21 and 21.9 grams of EEP was added over 30 minutes through the initiator addition funnel. After this second initiator feed was complete, the initiator addition funnel was rinsed with 15.2 grams of BuAc. The reaction was then held at 150° C. for 60 minutes. After the 60 minute hold, the reaction was cooled and poured into a suitable container. The final measured solids content of the resin was determined to be 54.84% solids.

Synthesis Example E: Styrene-Maleic Anhydride-SILQUEST A-174 Copolymer

In a four neck round bottom flask, 106.6 grams of ethyl-3-ethoxypropionate (EEP), 82.3 grams of butyl acetate (BuAc), and 22.0 grams of 2-ethyl-2-oxazoline was added and the flask was set up with a mechanical stir blade, thermocouple, and reflux condenser. The flask containing EEP, BuAc, and 2-ethyl-2-oxazoline solvents was heated to a set point of 150° C. under a nitrogen atmosphere. A monomer solution containing 98.4 grams of EEP, 98.4 grams of BuAc, 56.8 grams of SILQUEST A-174, 113.6 grams of maleic anhydride, 227.1 grams of STY, and 170.3 grams of BA was thoroughly mixed in a suitable container until the maleic anhydride was fully dissolved. A solution of 79.5 grams of TRIGONOX 21 and 39.6 grams of EEP was prepared and added into the flask over 190 minutes through an initiator addition funnel. Ten minutes after the initiator solution started, the monomer solution was started and added over 180 minutes through a monomer addition funnel.

After both initiator and monomer feeds were complete, the monomer addition funnel was rinsed with 6.6 grams of EEP and 8.1 grams of BuAc. Then another solution of 5.5 grams of TRIGONOX 21 and 21.9 grams of EEP was added over 30 minutes through the initiator addition funnel. After this second initiator feed was complete, the initiator addition funnel was rinsed with 15.16 grams of BuAc. The reaction was then held at 150° C. for 60 minutes. After the 60 minute hold, the reaction was cooled and poured into a suitable container. The final measured solids content of the resin was determined to be 54.85% solids.

Synthesis Example F: HDI Trimer-1,6-Hexanediol-DYNASYLAN 1189 Adduct

In a four neck round bottom flask, 602.3 grams of DESMODUR N3600 (Hexamethylene Diisocyanate Trimer available from Covestro), 804.5 grams of butyl acetate (BuAc), 35.0 grams of vinyl trimethoxysilane (SILQUEST A-171 available from Momentive) and 1.0 gram of dibutyltin dilaurate was added under a nitrogen atmosphere and the flask was set up with a mechanical stir blade, thermocouple, and reflux condenser. The reaction mixture was then heated to 50° C. Upon reaching 50° C., 56.9 grams of 1,6-hexanediol was added to the flask at a rate which did not allow the resulting exotherm to exceed 60° C. The reaction mixture was then stirred at 60° C. for 30 minutes and then titrated for isocyanate equivalent weight (theory 642 g/eq NCO). Next, 555.4 grams of DYNASYLAN 1189 (N-(n-butyl)-3-aminopropyltrimethoxysilane available from Evonik) was added at a rate which did not allow the resulting exotherm to exceed 70° C. The reaction mixture was then stirred at 70° C. for 30 minutes. After the 30 minute hold, an IR spectrum was taken to ensure the absence of isocyanate functional groups at 2200 cm-1. After confirmation of the absence of isocyanate functional groups, the reaction was cooled and poured out of the flask. The final measured solids content of the resin was determined to be 56.72%.

Synthesis Example G: Carbodiimide

In a four neck round bottom flask, 385.7 grams of 4,4'-methylene dicyclohexyl diisocyanate and 2.87 grams of 1-methyl-2,3-dihydrophosphole 1-oxide was added and the flask was set up with a mechanical stir blade, thermocouple, and reflux condenser. The flask was heated to a set point of 160° C. under a nitrogen sparge. The reaction mixture was held at 160° C. until the measured isocyanate equivalent weight of the mixture reached 328 grams/equivalent, at this time the mixture was cooled to 60° C. and the reaction mixture was no longer sparged with nitrogen. During this period of cooling 108.1 grams of butyl acetate was added to the flask. Once the mixture reached 60° C., 106.4 grams of dibutylamine was added over 60 minutes through an addition funnel. The funnel was rinsed with 9.8 grams of butyl acetate and the reaction mixture was held at 70° C. until the peak corresponding to the isocyanate group disappeared by infrared spectroscopy. The final measured solids of the resin was determined to be 79.62% solids.

Synthesis Example H: Carbodiimide-Silane

In a four neck round bottom flask, 314.9 grams of 4,4'-methylene dicyclohexyl diisocyanate and 2.34 grams of 1-methyl-2,3-dihydrophosphole 1-oxide was added and the flask was set up with a mechanical stir blade, thermocouple, and reflux condenser. The flask was heated to a set point of 160° C. under a nitrogen sparge. The reaction mixture was held at 160° C. until the measured isocyanate equivalent weight of the mixture reached 332 grams/equivalent, at this time the mixture was cooled to 60° C. and the reaction mixture was no longer sparged with nitrogen. During this period of cooling 95.2 grams of butyl acetate was added to the flask. Once the mixture reached 60° C., 164.4 grams of N—(N-butyl)-3-aminopropyltrimethoxysilane was added over 60 minutes through an addition funnel. Then funnel was rinsed with 22.4 grams of butyl acetate and the reaction mixture was held at 70° C. until the peak corresponding to the isocyanate group disappeared by infrared spectroscopy. The final measured solids of the resin was determined to be 78.29% solids.

Synthesis Example I: Hydroxybutylacrylate Polyol Containing Alkoxysilane

In a four neck round bottom flask, 137.9 grams of butyl acetate (BuAc) was added and the flask was set up with a mechanical stir blade, thermocouple, and reflux condenser. The flask containing BuAc solvent was heated to a set point of 130° C. under a nitrogen atmosphere. A monomer solution containing 92.3 grams of MMA, 88.4 grams of 4-HBA, 35.4 grams of BA, 53.0 grams of STY, 49.1 grams of BMA, and 35.4 grams of SILQUEST A-174 was thoroughly mixed in a separate container. A solution of 17.7 grams of TRIGONOX 131 and 49.5 grams of BuAc was prepared and added into the flask over 190 minutes. Ten minutes after the initiator solution started, the monomer solution was started and added over 180 minutes. After both initiator and monomer feeds were complete, the monomer addition funnel was rinsed with 14.1 grams of BuAc. The reaction was then held at 130° C. for 60 minutes. Then another solution of 1.8 grams of TRIGONOX 131 and 5.3 grams of BuAc was added over 30 min. After this second initiator feed was complete, the initiator addition funnel was rinsed with 14.1 grams of BuAc. The reaction was then held at 130° C. for 60 minutes. After the 60 minute hold, the reaction was cooled and poured into a suitable container. The final measured solids of the resin was determined to be 61.89% solids.

Curable film-forming compositions of the present invention and of a comparative nature were prepared as shown in the examples below. Methods for forming a coated substrate in accordance with the present invention are also demonstrated in the Examples below.

Example 1

Example 1 illustrates the curing of an acrylic polyol with anhydride functional silane. Four compositions were prepared from the mixtures of ingredients shown in Table 1. Composition I is a comparative example demonstrating a curable film-forming composition comprising a polyol in combination with an isocyanatosilane. Composition II is an example of the present invention, demonstrating a curable film-forming composition comprising a polyol in combination with an anhydride functional compound that further contains silane functional groups. Composition III is a control example, demonstrating a curable film-forming composition comprising a polyol in combination with an aminosilane. Composition IV is a control example, demonstrating a curable film-forming composition comprising a polyol in combination with an epoxysilane. In each Example, polyol, functional silane, and solvent were mixed, then catalyst was added and solutions were homogenized. Solutions were drawn down on sanded and solvent-wiped POW- ERCRON 8000 cold-rolled steel panels (available from ACT Test Panels LLC) with a 6 mil drawdown bar, and allowed to cure at ambient conditions. Pencil hardness and methyl ethyl ketone (MEK) resistance were measured after 24 hours. Pencil hardness was determined by placing a flat edge hardness pencil on the dried coating at an approximately 450 angle, applying pressure to the pencil, and pushing upward to draw a short straight line; if the pencil cut through the coating, the hardness of the pencil was decreased until the pencil did not cut through the coating. MEK resistance was determined by a modified version of ASTM D5402-19 using an MEK-saturated Kimberly Clark Professional Wypall X80.

TABLE 1

Compositions I-IV

| Components | I COMP | II | III CONTROL | IV CONTROL |
|---|---|---|---|---|
| PARALOID AU685HS[1] | 10.00 | 10.00 | 10.00 | 10.00 |
| 3-(triethoxysilyl)propyl isocyanate[2] | 3.04 | | | |
| 3-(triethoxysilyl)propyl succinic anhydride[3] | | 3.00 | | |
| SILQUEST A-1110[4] | | | 3.00 | |
| SILQUEST A-187[5] | | | | 3.00 |
| ARMEEN DMCD[6] | 0.33 | 0.33 | 0.33 | 0.33 |
| Dibutyl tin diacetate (10% solution in xylenes) | 1.10 | 1.10 | 1.10 | 1.10 |
| Xylenes | 2.00 | 2.00 | 2.00 | 2.00 |
| Percent Solids | 70% | 70% | 70% | 70% |
| Eq. ratio | 1.2 | 1.0 | N/A | N/A |
| Results | | | | |
| 24 h Pencil Hardness | <4 B | 4 B | <4 B | <4 B |
| 24 h MEK Double Rubs | 7 | 80 | 2 | 27 |

[1]Acrylic polyol with hydroxyl equivalent weight of 800 at 80% solids in n-butyl acetate available from Dow Chemical
[2]Available from Sigma-Aldrich
[3]Available from Gelest, Inc.
[4]3-aminopropyltrimethoxy silane available from Momentive
[5]3-glycidoxypropyltrimethoxy silane available from Momentive
[6]Dimethylcocoamine available from Akzo Nobel The data from Example 1 demonstrate that curing of a polyol with an anhydride-functional silane gives improved cure performance compared to isocyanate, amine, or epoxy functional silanes under ambient conditions.

Example 2

Example 2 illustrates the curing of an acrylic polyol with various anhydride and silane functional curing packages. Composition V is a comparative example demonstrating a curable film-forming composition comprising a polyol in combination with a polyisocyanate. Composition VI is an example of the present invention, demonstrating a curable film-forming composition comprising a polyol in combination with an anhydride functional polymer and a urethane silane. Composition VII is an example of the present invention, demonstrating a curable film-forming composition comprising a polyol in combination with an anhydride functional polymer, an aminosilane, and a urethane silane. Composition VIII is an example of the method of the present invention, demonstrating application of a curable film-forming composition comprising a polyol in combination with an anhydride functional polymer that further includes silane functional groups, and a urethane silane to a substrate. Composition IX is an example of the present invention, demonstrating a curable film-forming composition comprising a polyol in combination with an anhydride- and silane-functional small molecule and a urethane silane. Composition X is an example of the present invention, demonstrating a curable film-forming composition comprising a polyol in combination with an anhydride functional acrylic polymer and a urethane silane. In each Example, polyol, catalysts, and solvent were combined as the A package; anhydride and silane functional components were combined as the B package. A and B components were mixed and immediately drawn down on sanded and solvent-wiped POWERCRON 8000 cold-rolled steel panels (available from ACT Test Panels LLC) with a 6 mil drawdown bar, and allowed to cure at ambient conditions. Tack free time was determined as the approximate time at which the coating could be touched lightly without any adhering to the finger. MEK resistance was determined as in Example 1. Konig Hardness was determined using a BYK Pendulum Hardness Tester in accordance with ASTM D4366-16. 60° gloss values were determined using a Rhopoint DOI/Haze/Glossmeter.

TABLE 2

Compositions V-X

| Components | V COMP | VI | VII | VIII | IX | X |
|---|---|---|---|---|---|---|
| Hydroxybutylacrylate Polyol of Synthesis Example A | 10.00 | 10.00 | 10.00 | 10.00 | 10.00 | 10.00 |
| ARMEEN DMCD | | 0.31 | 0.31 | 0.31 | 0.31 | 0.31 |
| Dibutyltin dilaurate (10% in xylenes) | 0.09 | | | | | |
| Dibutytin diacetate (10% in n-BuAc) | | 0.28 | 0.28 | 0.28 | 0.28 | 0.28 |
| n-Butyl acetate | 4.45 | 2.70 | 2.90 | 3.10 | 4.00 | 4.00 |
| DYNASYLAN 1189[1] | | | 0.24 | | | |
| DESOTHANE CA8200B[2] | 2.95 | | | | | |
| Maleic-Anhydride-Octene Copolymer of Synthesis Example B | | 5.95 | 6.54 | | | |
| Maleic Anhydride-Octene-Vinyl TEOS Copolymer of Synthesis Example C | | | | | 5.60 | |
| 3-(triethoxysilyl) propyl succinic anhydride | | | | | | 3.14 |

TABLE 2-continued

| | Compositions V-X | | | | | |
|---|---|---|---|---|---|---|
| Components | V COMP | VI | VII | VIII | IX | X |
| Styrene-Acrylic-Maleic Anhydride Copolymer of Synthesis Example D | | | | | | 8.38 |
| Silane-terminated Urethane Oligomer of Synthesis Example F | | 1.85 | 2.03 | 1.85 | 1.85 | 1.85 |
| Results | | | | | | |
| Tack-Free Time | <1 h | 4-6 h | <1 h | 2-4 h | 2-4 h | 1-2 h |
| 24 h MEK Double Rubs | >100 | >100 | >100 | >100 | >100 | >100 |
| 24 h Konig Hardness (s) | 122 | 92 | 102 | 92 | 98 | 124 |
| 1 wk Konig Hardness (s) | 130 | 133 | 136 | 134 | 134 | 138 |
| 60° Gloss | 89.9 | 88.5 | 89.1 | 88.3 | 89.4 | 86.8 |

[1]N-(n-butyl)-3-aminopropyltrimethoxysilane available from Evonik
[2]Isocyanate hardener available from PPG The data from example 2 demonstrate that a variety of curing packages combining anhydride and silane functionality give films that cure under ambient conditions to give materials with competitive solvent resistance, dry times, hardness, and appearance to controls cured with isocyanates.

Example 3

Example 3 illustrates the curing of a pigmented, low gloss polyol package with curing packages combining anhydride and silane functionality. Composition XI is a comparative example demonstrating a pigmented curable film-forming composition comprising a polyol in combination with a polyisocyanate. Composition XII is an example of the present invention, demonstrating a pigmented curable film-forming composition comprising a polyol in combination with an anhydride- and silane-functional small molecule and a urethane silane. Composition XIII is an example of the present invention, demonstrating a pigmented curable film-forming composition comprising a polyol in combination with an anhydride functional acrylic polymer and a urethane silane. Composition XIV is an example of the method of the present invention, demonstrating application of a pigmented curable film-forming composition comprising a polyol in combination with an anhydride- and silane-functional acrylic polymer and a urethane silane to a substrate. Composition XV is an example of the present invention, demonstrating a pigmented curable film-forming composition comprising a polyol in combination with an anhydride- and silane-functional small molecule. In each Example, catalysts, solvents, and anhydride and silane functional components were mixed as B packages. The pigmented polyol A package was mixed with the B package then sprayed onto sanded and solvent-wiped POWERCRON 8000 cold-rolled steel panels (available from ACT Test Panels LLC) with a SATA HVLP spray gun with a 1.7 μm orifice at an application pressure of ca. 30 psi. The resulting films were allowed to dry at ambient conditions. Tack free time, MEK resistance, and gloss values were determined as described above. Fischer Microhardness values were determined in accordance with ISO-14577-1. Impact elongation was determined using a modified version of ASTM-D6905-03 using a Gardco GE Universal Impact Tester Model #172.

TABLE 3

| | Compositions XI-XV | | | | |
|---|---|---|---|---|---|
| Components | XI COMP | XII | XIII | XIV | XV |
| DESOTHANE CA 8213[1] | 207.75 | | | | |
| DESOTHANE CA 8214[2] | | 161.2 | 138.4 | 139.4 | 161.2 |
| ARMEEN DMCD | | 3.88 | 3.32 | 3.35 | 3.88 |
| Dibutyltin diacetate (10% in xylenes) | | 4.03 | 3.46 | 3.50 | 4.03 |
| DESOTHANE CA8200B | 54.83 | | | | |
| D871 reducer[3] | 37.50 | 38.69 | | | 38.69 |
| 3-(triethoxysilyl)propyl succinic anhydride | | 38.83 | | | 38.83 |
| Styrene-acrylic-maleic anhydride copolymer of Synthesis Example D | | | | 107.81 | |
| Styrene-acrylic-maleic anhydride-acrylic silane copolymer of Synthesis Example E | | | 109.12 | | |
| Silane-terminated urethane oligomer of Synthesis Example F | | 53.20 | 45.67 | 46.00 | |
| Results | | | | | |
| Average Film Thickness (mil) | 1.49 | 1.60 | 0.98 | 1.00 | 0.54 |
| Tack Free Time (h) | 2 | 2 | 4 | 2 | 6 |
| 24 h MEK Double Rubs | >100 | >100 | >100 | 20* | >100 |
| 24 h Fischer Microhardness (N/mm²) | 22.5 | 31.5 | 16.1 | 16.4 | 47.2 |
| 1 wk Fischer Microhardness (N/mm²) | 61.5 | 67.8 | 83.0 | 55.8 | 57.5 |
| Impact Elongation | 40% | 20% | 40% | 20% | 10% |
| 20° Gloss | 0.2 | 0.3 | 4.8 | 2.4 | 0.2 |

[1]Grey pigmented polyol package available from PPG
[2]Grey pigmented polyol package available from PPG
[3]Paint thinner available from PPG
*While MEK resistance of this composition is relatively low, Fischer microhardness, impact elongation and 20° Gloss are acceptable.

The data from Example 3 illustrates that polyol packages containing pigments and additives can be cured with mixtures combining anhydride and silane functional groups to give coatings with dry times, solvent resistance, hardness, appearance, and physical properties competitive to commercial ambient cure isocyanate-based coatings.

Example 4

Example 4 illustrates the curing of a pigmented, high gloss polyol package with various curing packages combining anhydride and/or silane functionality. Composition XVI is a comparative example demonstrating a pigmented curable film-forming composition comprising a polyol in combination with a polyisocyanate. Composition XVII is a comparative example demonstrating a pigmented curable film-forming composition comprising a polyol in combination with an anhydride-functional addition polymer. Composition XVIII is an example of the present invention, demonstrating a pigmented curable film-forming composition comprising a polyol in combination with an anhydride functional addition polymer and a urethane silane. Composition XIX is an example of the present invention, demonstrating a pigmented curable film-forming composition comprising a polyol in combination with an anhydride functional addition polymer, an aminosilane, and a urethane silane. Composition XX is an example of the method of the present invention, demonstrating application of a pigmented curable film-forming composition comprising a polyol in combination with an anhydride- and silane-functional polymer and a urethane silane to a substrate. In each Example, catalysts were added to the prepared pigmented polyol. Anhydride and silane functional materials were combined as B packages. The pigmented polyol A package was mixed with the B package then sprayed onto sanded and solvent-wiped POWERCRON 8000 cold-rolled steel panels (available from ACT Test Panels LLC) with a SATA HVLP spray gun with a 1.7 μm orifice at an application pressure of ca. 30 psi. The resulting films were allowed to dry at ambient conditions. Tack free time, MEK resistance, gloss, and hardness values were determined as described above. Aeroshell resistance was determined by submerging a coated substrate in Aeroshell hydraulic fluid for 24 hours at 150° F.; panels were removed, excess fluid was removed with a Wypall, and the coated panels were allowed to stand at room temperature for 1 hour. Pencil hardness was determined as described above and compared to pencil hardness values determined before fluid exposure.

TABLE 4

Compositions XVI-XX

| Components | XVI COMP | XVII COMP | XVIII | XIX | XX |
|---|---|---|---|---|---|
| DESOTHANE CA 8204[1] | 80.0 | 75.0 | 75.0 | 75.0 | 75.0 |
| ARMEEN DMCD | | 2.85 | 2.85 | 2.85 | 2.85 |
| Dibutyltin diacetate (10% in nBuAc) | | 2.55 | 2.55 | 2.55 | 2.55 |
| DYNASYLAN 1189 | | | | 2.22 | |
| DESOTHANE CA8000D[2] | 56.8 | | | | |
| Maleic Anhydride-Octene Copolymer of Synthesis Example B | | | 54.35 | 54.38 | 59.82 |
| Maleic Anhydride-Octene-Vinyl Triethoxysilane Copolymer of Synthesis Example C | | | | | 51.22 |
| Silane-terminated urethane oligomer of Synthesis Example F | | | 15.95 | 17.55 | 15.95 |

TABLE 4-continued

Compositions XVI-XX

| Components | XVI COMP | XVII COMP | XVIII | XIX | XX |
|---|---|---|---|---|---|
| Results | | | | | |
| Average Film Thickness (mil) | 2.0 | 2.5 | 2.5 | 2.3 | 2.1 |
| Tack Free Time | <2 h | 3-6 h | 3-6 h | 3-6 h | 3-6 h |
| 24 h MEK Double Rubs | >100 | >100 | >100 | >100 | >100 |
| 60° Gloss | 94.2 | 90.1 | 91.3 | 91.5 | 90.9 |
| 24 h Fischer Microhardness (N/mm$^2$) | 6.3 | 3.8 | 4.8 | 8.0 | 5.6 |
| 1 wk Fischer Microhardness (N/mm$^2$) | 9.2 | 16.6 | 29.7 | 37.1 | 34.8 |
| 2 wk Fischer Microhardness (N/mm$^2$) | 12.4 | 22.7 | 37.7 | 44.2 | 45.6 |
| 24 h Aeroshell Solvent Exposure | No softening | Softens by 3 pencils | Softens by 1 pencil | No softening | No softening |

[1]White pigmented polyol package available from PPG
[2]Isocyanate hardener available from PPG The data from Example 4 illustrates that polyol packages containing pigments and additives can be cured with mixtures combining anhydride and silane functional groups to give coatings with dry times, solvent resistance, hardness, appearance, and physical properties competitive to commercial ambient cure isocyanate-based coatings. Furthermore, the examples illustrate that the addition of silane-functionality to anhydride-based curing packages gives coatings with greater hardness and solvent resistance.

Example 5

Example 5 illustrates the curing of an acrylic polyol with a combination of anhydride, carbodiimide, and silane. Five compositions were prepared from the mixtures of ingredients shown in Table 5. Composition XXI is a comparative example demonstrating a curable film-forming composition comprising a polyol in combination with a polyisocyanate. Composition XXII is a comparative example demonstrating a curable film-forming composition comprising a polyol in combination with an anhydride-functional compound and a carbodiimide. Composition XXIII is an example of the present invention, demonstrating a curable film-forming composition comprising a polyol in combination with an anhydride and a carbodiimide with silane functionality. Composition XXIV is an example of the present invention, demonstrating a curable film-forming composition comprising a polyol in combination with an anhydride- and silane-functional small molecule and a carbodiimide. Composition XXV is an example of the present invention, demonstrating a curable film-forming composition comprising a polyol in combination with an anhydride- and silane-functional small molecule and a carbodiimide with silane functionality. In each Example, polyol, catalyst, and additives were mixed as an A package, and carbodiimide, anhydride, and silane functionality were combined as a B package. The polyol A package was mixed with the B package then sprayed onto sanded and solvent-wiped POWERCRON 8000 cold-rolled steel panels (available from ACT Test Panels LLC) coated with a white thermoplastic basecoat using a SATA HVLP spray gun with a 1.2 μm orifice at an application pressure of ca. 28 psi. The resulting films were allowed to dry at ambient conditions. Tack free time, MEK resistance, and hardness were determined as described above.

TABLE 5

Compositions XXI-XXV

| Components | XXI COMP | XXII COMP | XXIII | XXIV | XXV |
|---|---|---|---|---|---|
| Hydroxybutylacrylate Polyol of Synthesis Example A | 75 | 50 | 50 | 50 | 50 |
| ARMEEN DMCD[1] | | 1.55 | 1.55 | 1.55 | 1.55 |
| Dibutyltin dilaurate (10% in xylenes) | 0.07 | | | | |
| Dibutyltin diacetate (10% in nBuAc) | | 1.40 | 1.40 | 1.40 | 1.40 |
| Ethyl 3-ethoxypropionate | 25.00 | 20.00 | 20.00 | 20.00 | 20.00 |
| CHIGUARD 328[2] | 0.99 | 0.98 | 1.06 | 1.10 | 1.18 |
| EVERSORB 93[3] | 0.66 | 0.66 | 0.71 | 0.73 | 0.78 |
| BYK-306[4] | 0.13 | 0.13 | 0.14 | 0.15 | 0.16 |
| n-Butyl acetate | 12.5 | 20 | 25 | 25 | 25 |
| Methyl amyl ketone | 2.22 | | | | |
| 3-(triethoxysilyl)propyl succinic anhydride | | | | 16.55 | 16.55 |
| MHHPA | | 8.69 | 8.69 | | |
| DESMODUR N 3390 BA/SN[5] | 19.94 | | | | |
| Carbodiimide of Synthesis Example G | | 30.04 | | 30.04 | |
| Carbodiimide-Silane of Synthesis Example H | | | 36.40 | | 36.40 |
| Results | | | | | |
| Tack-Free Time [h] | 1-2 | <1 | <1 | 1-2 | 1-2 |
| 24 h MEK Double Rubs | >100 | 30 | >100 | >100 | >100 |
| 24 h Konig Hardness [s] | 23 | 16 | 25 | 17 | 37 |
| 1 wk Konig Hardness [s] | 42 | 32 | 46 | 45 | 87 |

[1]Dimethylcocoamine available from Akzo Nobel
[2]2-(3',5'-di-t-amyl-2'-hydroxyphenyl) benzotriazole, available from Chitec Technology
[3]Hindered amine light stabilizer available from Everlight Chemical
[4]Surface additive available from BYK
[5]Hexamethylene diisocyanate trimer available from Covestro Example 5 illustrates that polyols cured with combinations of anhydride, carbodiimide, and silane give fast cure response, and hardness competitive with isocyanate-cured controls. Additionally, the results demonstrate that the presence of a hydrolysable functional group is required to develop coatings with appropriate cure response.

Example 6

Example 6 illustrates the curing of a pigmented polyol package with a combination of anhydride, carbodiimide, and silane. Five compositions were prepared from the mixtures of ingredients shown in Table 6. Composition XXVI is a comparative example demonstrating a pigmented curable film-forming composition comprising a polyol in combination with a polyisocyanate. Composition XXVII is a comparative example demonstrating a pigmented curable film-forming composition comprising a polyol in combination with an anhydride-functional compound and a carbodiimide. Composition XXVIII is an example of the present invention, demonstrating a pigmented curable film-forming composition comprising a polyol in combination with an anhydride- and silane-functional small molecule and a carbodiimide. Composition XXIX is an example of the present invention, demonstrating a pigmented curable film-forming composition comprising a polyol in combination with an anhydride and a carbodiimide with silane functionality. Composition XXX is an example of the present invention, demonstrating a pigmented curable film-forming composition comprising a polyol in combination with an anhydride- and silane-functional small molecule and a carbodiimide with silane functionality. In each Example, polyol, catalyst, and additives were mixed as an A package, and carbodiimide, anhydride, and silane functionality were combined as a B package. The polyol A package was mixed with the B package then sprayed onto sanded and solvent-wiped POWERCRON 8000 cold-rolled steel panels (available from ACT Test Panels LLC) using a SATA HVLP spray gun with a 1.7 μm orifice at an application pressure of ca. 28 psi. The resulting films were allowed to dry at ambient conditions. Tack free time, MEK resistance, and hardness were determined as described above.

TABLE 6

Compositions VI-X

| Components | XXVI COMP | XXVII COMP | XXVIII | XXIX | XXX |
|---|---|---|---|---|---|
| DESOTHANE CA8204[1] | 80.0 | 50.0 | 45.0 | 50.0 | 45.0 |
| ARMEEN DMCD | | 1.82 | 1.90 | 2.01 | 2.07 |
| Dibutyltin diacetate (10% in nBuAc) | | | 6.32 | 6.69 | 6.88 |
| DESOTHANE CA8000D[2] | 56.75 | | | | |
| 3-(triethoxysilyl)propyl succinic anhydride | | | 18.16 | | 18.16 |
| MHHPA | | 10.59 | | 10.59 | |
| Carbodiimide of Synthesis Example G | | 36.65 | 32.99 | | |
| Carbodiimide-Silane of Synthesis Example H | | | | 44.42 | 39.98 |
| n-Butyl acetate | | 23 | 20 | 20 | 22 |
| Results | | | | | |
| Tack-Free Time [h] | 1-2 | <1 | <1 | <1 | <1 |
| 24 h MEK Double Rubs | >100 | 10 | 50 | >100 | >100 |
| 24 h Konig Hardness [s] | 22 | 13 | 47 | 44 | 55 |
| 1 wk Konig Hardness [s] | 18 | 20 | 72 | 56 | 83 |

[1]White pigmented polyol package available from PPG
[2]Isocyanate hardener package available from PPG Example 6 illustrates that pigmented polyols cured with combinations of anhydride, carbodiimide, and silane give fast cure response, and hardness competitive with isocyanate-cured controls. Additionally, the results demonstrate that the presence of silane is required to develop coatings with appropriate cure response.

Example 7

Example 7 illustrates the curing of various combinations of acrylic polyol, anhydride, carbodiimide, and silane functionality. Four compositions were prepared from the mixtures of ingredients shown in Table 7. Composition XXXI is an example of the present invention, demonstrating a curable film-forming composition comprising a polyol in combination with an anhydride-functional compound and a carbodiimide with silane functionality. Composition XXXII is an example of the present invention, demonstrating a curable film-forming composition comprising a polyol in combination with an anhydride-functional compound and a carbodiimide with silane functionality (no catalyst). Composition XXXIII is an example of the present invention, demonstrating a curable film-forming composition comprising an anhydride-functional compound in combination with a carbodiimide with silane functionality. Composition XXXIV is a comparative example demonstrating a curable film-forming composition comprising a polyol in combination with a carbodiimide with silane functionality. In each Example, polyol, catalyst (if present), and additives were mixed as an A package, and carbodiimide, anhydride, and silane functionality were combined as a B package. The polyol A package was mixed with the B package then drawn down on solvent-wiped Powercron 8000 cold-rolled steel panels (available from ACT Test Panels LLC) using a 10 mil drawdown bar. The resulting films were allowed to dry at ambient conditions. Gel time was determined as the time at which the container of paint could be inverted with no observable flow in ca. 30 s. Tack free time, MEK resistance, gloss, and hardness were determined as described above.

TABLE 7

Compositions XXXI-XXXIV

| Component | XXXI | XXXII | XXXIII | XXXIV COMP |
|---|---|---|---|---|
| Hydroxybutylacrylate Polyol of Synthesis Example A | 6.5 | 6.5 | | 6.5 |
| ARMEEN DMCD | 0.25 | | 0.25 | 0.25 |
| n-Butyl acetate | 5.75 | 5.75 | 4.25 | 4.65 |
| MHHPA | 1.13 | 1.13 | 1.13 | |
| Carbodiimide-Silane of Synthesis Example H | 4.93 | 4.93 | 4.93 | 4.93 |
| Results | | | | |
| Tack Free Time [h] | <1 | <1 | <1 | 4 |
| Gel Time | <1 h | <1 h | >4 wk | 3-4 h |
| 24 h MEK DR | >100 | >100 | >100 | <10 |
| 60° Gloss | 91.7 | 91.4 | 92.3 | |
| 1 wk Konig Hardness [s] | 143 | 130 | 108 | — |

Example 7 illustrates that a combination of anhydride, carbodiimide, and silane functionality give rapidly curing coatings with good solvent resistance and hardness. Further addition of polyols give cured films with much shortened pot-life.

Example 8

Example 8 illustrates the curing of various combinations of anhydride, carbodiimide, and silane functionality. Five polyol-free compositions were prepared from the mixtures of ingredients shown in Table 8. Composition XXXV is an example of the present invention, demonstrating a curable film-forming composition comprising an anhydride-functional compound in combination with and a carbodiimide with silane functionality. Composition XXXVI is a comparative example demonstrating a curable film-forming composition comprising an anhydride-functional compound in combination with a carbodiimide. Composition XXXVII is an example of the present invention, demonstrating a curable film-forming composition comprising an anhydride-functional compound in combination with a carbodiimide with silane functionality (no catalyst). Composition XXXVIII is an example of the present invention, demonstrating a curable film-forming composition comprising an anhydride-functional compound in combination with a carbodiimide with silane functionality. Composition XXXIX is an example of the present invention, demonstrating a curable film-forming composition comprising an anhydride- and silane-functional small molecule in combination with and a carbodiimide with silane functionality. In each Example, all components were mixed then drawn down on solvent-wiped Powercron 8000 cold-rolled steel panels (available from ACT Test Panels LLC) using a 10 mil drawdown bar. The resulting films were allowed to dry at ambient conditions. Tack free time, gel time, MEK resistance, and hardness were determined as described above.

TABLE 8

Compositions XXXV-XXXIX

| Component | XXXV | XXXVI COMP | XXXVII | XXXVIII | XXXIX |
|---|---|---|---|---|---|
| MHHPA | 2.26 | 2.26 | 2.26 | 2.26 | |
| 3-(triethoxysilyl)propyl succinic anhydride | | | | | 3.95 |
| ARMEEN DMCD | 0.50 | 0.50 | | 0.50 | 0.50 |
| n-Butyl acetate | 8.50 | 7.20 | 8.50 | 5.50 | 10.00 |
| Carbodiimide of Synthesis Example G | | 7.83 | | | |
| Carbodiimide-Silane of Synthesis Example H | 9.87 | | 9.87 | 4.94 | 9.54 |
| Results | | | | | |
| Tack-Free Time [h] | <1 h | <1 h | 2-4 h | <1 h | 1-2 h |
| Gel Time | >4 wk | >4 wk | >4 wk | >4 wk | >4 wk |
| 24 h MEK Double Rubs | >100 | 30 | >100 | >100 | >100 |
| 24 h Konig Hardness [s] | 105 | 58 | 119 | 46 | 132 |
| 1 wk Konig Hardness [s] | 97 | 44 | 173 | 38 | 152 |

The results demonstrate that compositions based on cyclic anhydride, carbodiimide, and silane cure rapidly to give films with good solvent resistance and hardness, but maintain long pot-life.

Example 9

Example 9 illustrates the use of an anhydride curing package with a polyol, a silane-substituted polyol, and the silane-substituted polyol with additional urethane silane. Three compositions were prepared from the mixtures of ingredients shown in Table 9. Composition XL is a comparative example demonstrating a curable film-forming composition comprising a polyol in combination with an anhydride functional acrylic polymer. Composition XLI is an example of the present invention, demonstrating a curable film-forming composition comprising an acrylic polyol with silane functionality in combination with an anhydride functional acrylic polymer. Composition XLII is an example of the present invention, demonstrating a curable film-forming composition comprising an acrylic polyol with silane functionality in combination with an anhydride functional acrylic polymer and a urethane silane. In each example, polyol, catalysts, and solvent were combined as the A package; anhydride and urethane silane were combined as the B package. A and B components were mixed and immediately drawn down on sanded and solvent-wiped POWERCRON 8000 cold-rolled steel panels (available from ACT Test Panels LLC) with a 10 mil drawdown bar, and allowed to cure at ambient conditions. Tack free time, MEK resistance, and hardness were determined as described above.

TABLE 9

Compositions XL-XLII

| Components | XL COMP | XLI | XLII |
|---|---|---|---|
| Hydroxybutylacrylate Polyol of Synthesis Example A | 7.50 | | |
| HBA-Silane Polyol of Synthesis Example I | | 7.5 | 7.5 |
| ARMEEN DMCD | 0.23 | 0.23 | 0.23 |
| Dibutytin diacetate (10% in n-BuAc) | 0.21 | 0.21 | 0.21 |
| n-Butyl acetate | 2.50 | 2.50 | 3.00 |
| Styrene-Acrylic-Maleic Anhydride Copolymer of Synthesis Example D | 6.28 | 6.27 | 6.27 |
| Silane-terminated Urethane Oligomer of Synthesis Example F | | | 2.72 |
| Results | | | |
| Tack-Free Time | 1-2 h | 1-2 h | 1-2 h |
| 24 h MEK Double Rubs | 20 | >100 | >100 |
| 1 wk Konig Hardness (s) | 74 | 77 | 72 |

Whereas particular embodiments of this invention have been described above for purposes of illustration, it will be evident to those skilled in the art that numerous variations of the details of the present invention may be made without departing from the scope of the invention as defined in the appended claims.

Therefore, we claim:

1. A non-aqueous, curable film-forming composition comprising:
   a) an anhydride functional compound that either (i) has a molecular weight of 98 to 400 as determined by mass spectroscopy, or (ii) comprises an addition polymer that is not prepared from an alkoxyvinylsilane;
   b) a carbodiimide functional compound; and
   c) hydrolyzable functional groups selected from alkoxysilane, acetoxysilane, ketoxime silane, silicate, titanate, and zirconate functional qroups that are present on at least one of the anhydride functional compound and the carbodiimide functional compound; wherein the curable film-forming composition is essentially free of polyepoxide functional compounds;
   wherein after application of the curable film-forming composition to a substrate to form a coated substrate, and upon subjecting the coated substrate to curing conditions, the curable film-forming composition undergoes multiple cure reactions.

2. The curable film-forming composition of claim 1, wherein the multiple cure reactions comprise i) reaction of the anhydride or an acid functional group derived therefrom with carbodiimide functional groups and ii) condensation of hydrolyzed groups formed from the hydrolyzable functional groups.

3. The curable film-forming composition of claim 1, wherein the anhydride functional compound comprises at least one of a 3-(trialkoxysilyl)propyl succinic anhydride, maleic anhydride, hexahydrophthalic anhydride, succinic anhydride, phthalic anhydride, tetrahydrophthalic anhydride, methyl hexahydrophthalic anhydride and methyl succinic anhydride.

4. The curable film-forming composition of claim 1, further comprising a hydroxyl functional compound.

5. The curable film-forming composition of claim 4, wherein the hydroxyl functional compound further comprises alkoxysilane functional groups.

6. The curable film-forming composition of claim 1, wherein the hydrolyzable functional groups comprise alkoxysilane functional groups that are present on at least the carbodiimide functional compound.

7. The curable film-forming composition of claim 1, further comprising a separate compound that is different from the anhydride functional compound and the carbodiimide functional compound, wherein hydrolyzable functional groups are present on the separate compound.

8. A non-aqueous, curable film-forming composition comprising:
   a) an anhydride functional compound that either (i) has a molecular weight of 98 to 400 as determined by mass spectroscopy, or (ii) comprises an addition polymer that is not prepared from an alkoxyvinylsilane;
   b) a hydroxyl functional compound having at least two hydroxyl functional groups; and
   c) hydrolyzable functional groups selected from alkoxysilane, acetoxysilane, ketoxime silane, silicate, titanate, and zirconate functional qroups that are present on the anhydride functional compound; wherein the curable film-forming composition is essentially free of polyepoxide functional compounds;
   wherein after application of the curable film-forming composition to a substrate to form a coated substrate, and upon subjecting the coated substrate to curing conditions, the curable film-forming composition undergoes multiple cure reactions.

9. The curable film-forming composition of claim 8, wherein the multiple cure reactions comprise i) reaction of the anhydride or an acid functional group derived therefrom with hydroxyl functional groups and ii) condensation of hydrolyzed groups formed from the hydrolyzable functional groups.

10. The curable film-forming composition of claim 8, wherein the curable film-forming composition comprises separate packages, wherein a first package comprises the anhydride functional compound a); and wherein a second package comprises the hydroxyl functional compound (i); and wherein the curable film-forming composition further comprises d) a catalytic material that catalyzes a chemical reaction between hydroxyl and anhydride functional groups; and wherein the packages are separate from one another until immediately prior to application of the curable film-forming composition to the substrate.

11. The curable film-forming composition of claim 8, wherein the hydroxyl functional compound further comprises alkoxysilane functional groups.

12. The curable film-forming composition of claim 8, further comprising a separate compound that is different from the anhydride functional compound and the hydroxyl functional compound, wherein hydrolyzable functional groups are present on the separate compound.

13. A method for forming a coated substrate comprising:
   (A) optionally applying a primary film-forming composition to at least a portion of a surface of the substrate to form a first coating;

(B) applying a curable film-forming composition directly to at least a portion of a surface of the substrate or to at least a portion of the first coating formed in step (A) to form a coated substrate, wherein the curable film-forming composition comprises:

a) an anhydride functional compound that either (i) has a molecular weight of 98 to 400 as determined by mass spectroscopy, or (ii) comprises an addition polymer that is not prepared from an alkoxyvinylsilane;

b) a carbodiimide functional compound; and c) hydrolyzable functional groups selected from alkoxysilane, acetoxysilane, ketoxime silane, silicate, titanate, and zirconate functional qroups that are present on the anhydride functional compound and/or the carbodiimide functional compound; wherein the curable film-forming composition is essentially free of polyepoxide functional compounds; and (C) subjecting the coated substrate to curing conditions whereby the curable film-forming composition undergoes multiple cure reactions via i) reaction of the anhydride or an acid functional group derived therefrom with carbodiimide functional groups and ii) condensation of hydrolyzed groups formed from the hydrolyzable functional groups.

14. The method of claim 13, wherein the coated substrate is subjected to a temperature of 35° C. to 250° C. to effect curing.

15. The method of claim 13, wherein the curable film-forming composition further comprises a hydroxyl functional compound; and wherein the curable film-forming composition comprises separate packages, wherein a first package comprises the anhydride functional compound a); and wherein a second package comprises the hydroxyl functional compound; and wherein the curable film-forming composition further comprises d) a catalytic material that catalyzes a chemical reaction between hydroxyl and anhydride functional groups; and wherein the packages are separate from one another until immediately prior to application of the curable film-forming composition to the substrate.

16. The method of claim 15, wherein the curable film-forming composition undergoes the cure reactions at a temperature below 35° C.

17. A coated substrate formed by the method of claim 13.

* * * * *